United States Patent [19]

Young

[11] Patent Number: 4,730,782
[45] Date of Patent: Mar. 15, 1988

[54] FISHING REEL WITH PAD DRAG MECHANISM

[75] Inventor: John N. Young, Fairfax, Calif.

[73] Assignee: Charles C. Worth Corporation, Kentfield, Calif.

[21] Appl. No.: 886,884

[22] Filed: Jul. 18, 1986

[51] Int. Cl.⁴ ............................................. A01K 89/02
[52] U.S. Cl. ..................... 242/84.5 A; 242/217; 464/99; 192/14
[58] Field of Search ..................... 242/84.5 A, 84.5 R, 242/84.51 A, 84.51 R, 84.2 R, 84.21 R, 217, 218, 219; 464/94, 96, 99; 192/14, 94

[56] References Cited

U.S. PATENT DOCUMENTS

| | | | |
|---|---|---|---|
| 1,980,345 | 11/1934 | Long et al. | 242/213 |
| 2,126,227 | 8/1938 | Stanley | 242/217 |
| 2,146,582 | 2/1939 | Kohlhepp | 242/219 |
| 2,462,365 | 2/1949 | Crawford | 242/219 |
| 3,144,217 | 8/1964 | Wood, Jr. | 242/84.5 A |
| 4,153,219 | 5/1979 | Kamikawa | 242/84.5 R |
| 4,598,879 | 7/1986 | Fujigiwa et al. | 242/84.51 R |

Primary Examiner—Lenard A. Footland
Attorney, Agent, or Firm—Melvin R. Stidham

[57] ABSTRACT

In a fishing reel, the drag stack includes the conventional star wheel and pressure plate that squeeze one or more friction member against the side of a rotatable member, such as the main gear to cause it to rotate with the pressure plate. However, instead of a washer of friction material, the friction member comprises small friction pads mounted on a carrier ring so as to be positioned symmetrically around the axis thereof, and to be engaged by the pressure plate. This leaves substantial areas of the pressure plate exposed for dissipation of heat.

3 Claims, 7 Drawing Figures

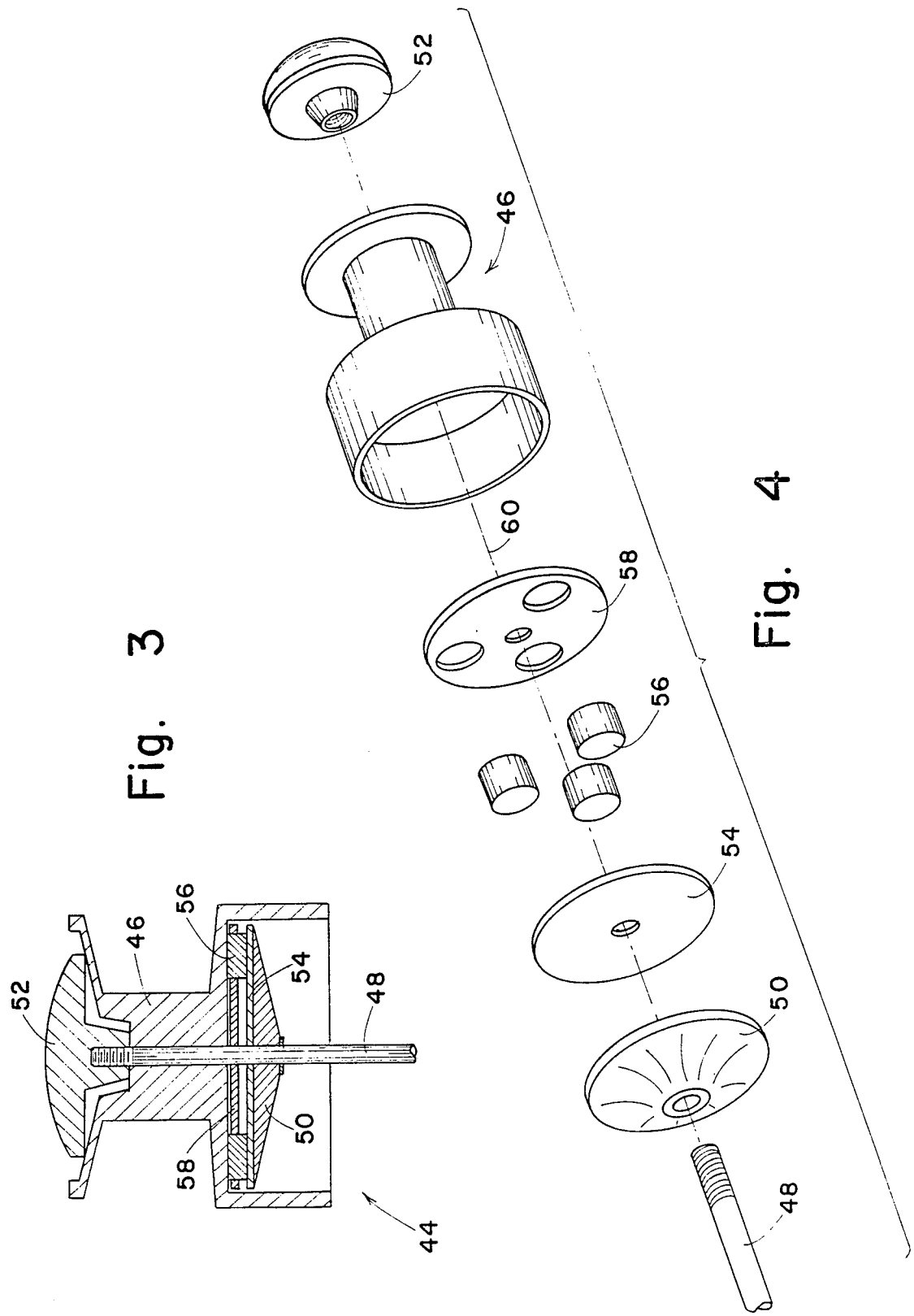

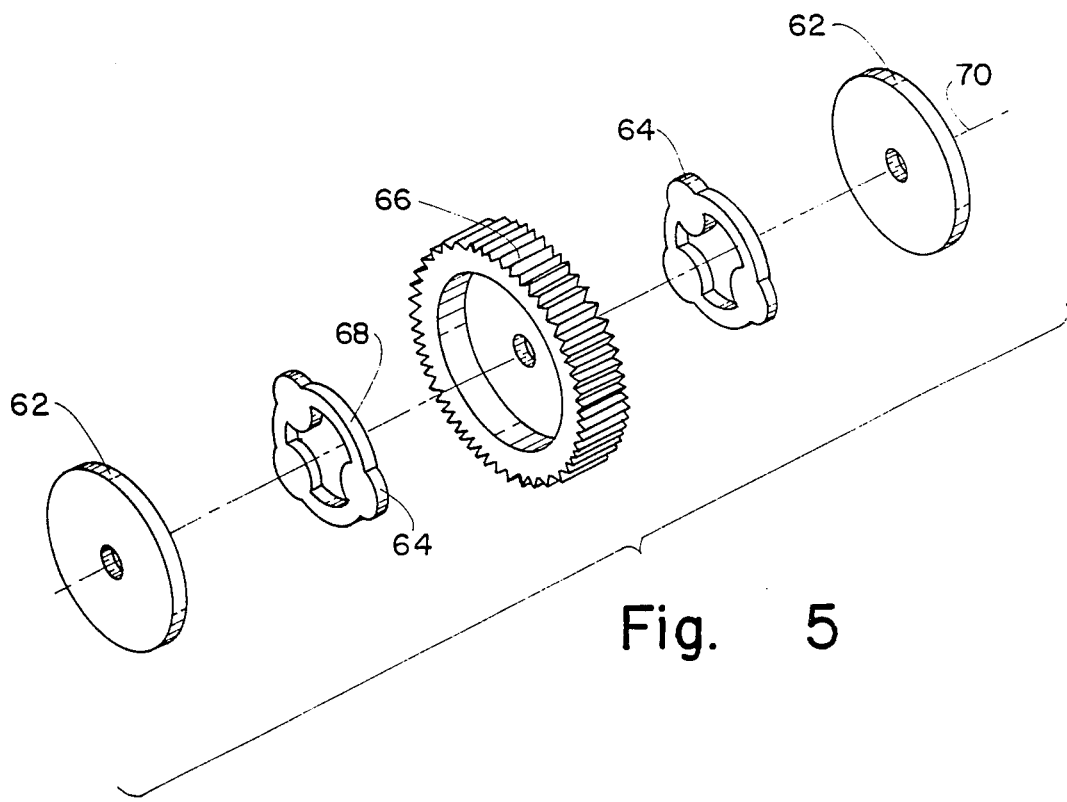
Fig. 5
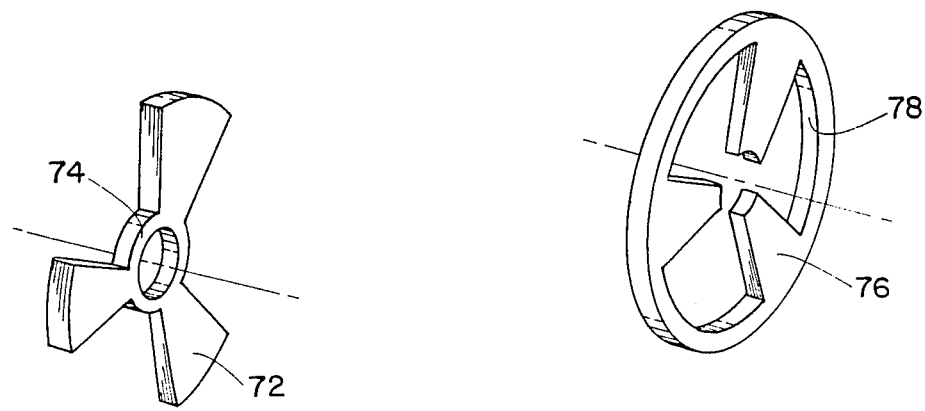
Fig. 6
Fig. 7

FISHING REEL WITH PAD DRAG MECHANISM

BACKGROUND OF THE INVENTION

Fishing reels are generally provided with drag mechanisms that allow some slippage in the line reeling system when tension on the line exceeds a predetermined setting. That is, when tension imposed by a hooked fish becomes excessive, it overcomes the drag to allow some line to be played out, thus reducing the chances of the line snapping under tension. Conventional fishing reel drag mechanisms generally incorporate a series of circular washers, alternately of metal and a high friction material, arranged face to face in a drag stack. Means are provided to compress the drag stack an adjusted amount in order to set the drag, that is, the amount of tension on the line that can be tolerated in reeling the line in. When that tension is exceeded, the drag device will slip and some line will play out. Common problems encountered in conventional drag mechanisms is their inability to operate smoothly and their relatively short life spans resulting from rapid wear of the friction surfaces.

OBJECTS OF THE INVENTION

It is an object of this invention to provide a drag mechanism for a fishing reel that is smooth in operation and has a relatively long life span.

It is a further object of this invention to provide a drag mechanism from which heat is rapidly dissipated.

It is a further object of this invention to provide a drag mechanism that can be installed in existing fishing reels without modification thereof.

Other objects and advantages of this invention will become apparent from the description to follow, particularly when read in conjunction with the accompanying drawing.

SUMMARY OF THE INVENTION

In carrying out this invention, I provide a drag mechanism wherein the conventional friction washers are replaced by small pads of friction material that are supported in spaced relationship around the axis of the drive. Consequently, just small areas of the pressure plates that squeeze the pads to adjust the drag are contacted, leaving considerable exposed areas for dissipation of heat.

BRIEF DESCRIPTION OF THE DRAWINGS

In the drawings:

FIG. 3 is a partial section view of a spinning reel showing another embodiment of this invention;

FIG. 4 is an exploded view in perspective of the drag mechanism of FIG. 3;

FIG. 5 is an exploded view in perspective of another embodiment of this invention; and FIGS. 6 and 7 are views in perspective of other drag pad embodiments.

DESCRIPTION OF PREFERRED EMBODIMENTS

Figure 1:
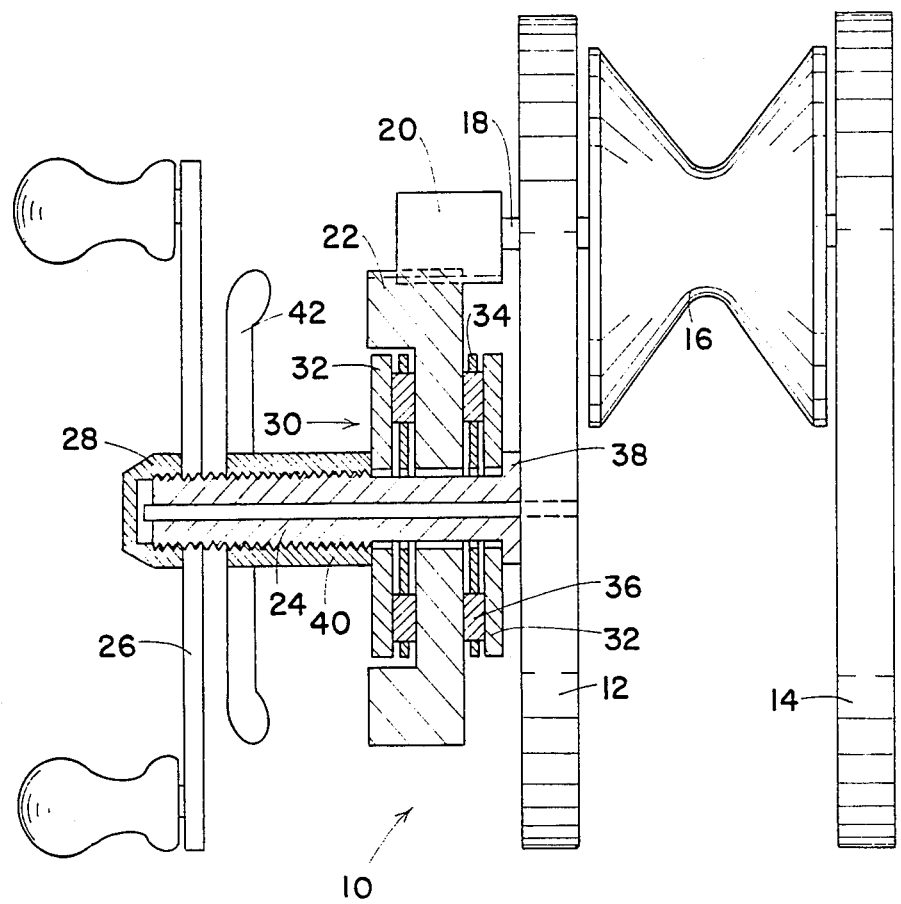
FIG. 1 is an elevation view partially in section of a bait casting reel embodying features of this invention.
Figure 2:
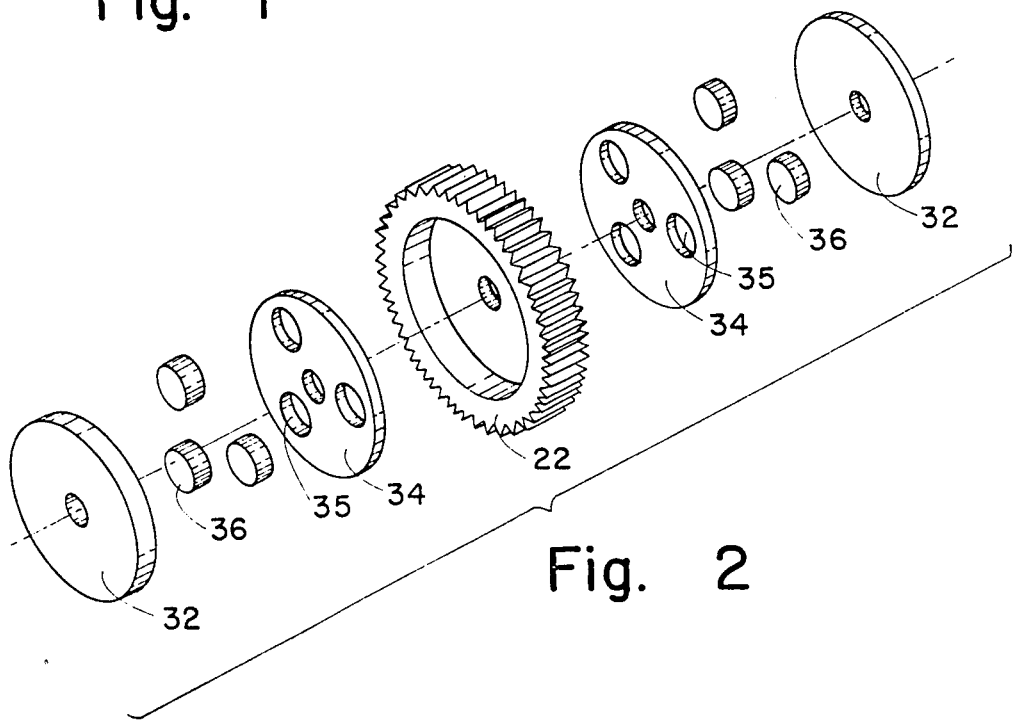
FIG. 2 is an exploded view in perspective showing the drag assembly of FIG. 1.

The Embodiment of FIGS. 1 and 2

The bait casting reel 10 of this invention has a pair of parallel side plates 12 and 14 with a spool 16 rotatably mounted between them. The spool 16 is mounted on a spool shaft 18, and keyed to the end of the shaft 18 is a pinion 20 that is driven by the main gear 22.

The main gear 22 is slidably and rotatably carried on a drive shaft 24 that rotates on one of the side plates 12 to be driven by a handle 26, which is fixed at the drive shaft 24 by means of a nut 28 threaded to the end thereof.

A drag stack 30 is formed by a "sandwich" of outer pressure plates 32, intermediate friction carrier discs or rings 34 with friction pads 36, and in the middle, the main gear 22. The pressure plates 32 are slidable but not rotatable on the drive shaft 24 and engage friction pads 36 carried on the carrier rings 34 to squeeze them against the sides of the main gear 22. As seen in FIG. 2, the carrier plates may have a number of holes 35 of any selected shape, e.g. wedge shaped or round as illustrated, and contained within each hole 35 is a complementary pad 36 of friction material.

The stack is squeezed between a flange 38 on the inner end of the drive shaft and a pressure sleeve 40 or hub of a star wheel 42, which is threaded onto the drive shaft 24. Hence, the tighter the drag stack 30 is squeezed, the greater will be the drag setting and a greater pull on the line (not shown) is needed to overcome the winding of the spool by the handle.

With the carrier ring 34 and drag pads 36 replacing the conventional drag washer, there is less surface contacted by the pressure plates 38 and, therefore, more pressure plate surface exposed for dissipation of heat. In addition, the relatively small areas of the friction pads 36 provides for a smoother drag.

The Embodiment of FIGS. 3 and 4

Here, the invention is applied to a spinning reel 44 wherein a spool 46 is rotatably carried on the main shaft 48. A support block 50, which is fixed as by pin 49 the main shaft 48, in a conventional manner is pulled through by a drag knob 52 to press to rotate with against the friction pads 56. This squeezes the friction pads 56 between the block 50 and the spool 46, which is rotatably carried on the main shaft 48. Again, the friction pads 56 are carried on a carrier ring 58, and they are spaced outward from the axis 60 thereof (FIG. 4) to leave a greater surface area of the block 50 exposed for dissipation of heat. In addition, the small surface areas of the friction pads 56 provide a smoother drag.

The Embodiment of FIG. 5

Here, the drag stack is similar to that shown in FIG. 2 with outer pressure plates 62 compressing friction pads 64 against the sides of the main gear 66. In this embodiment the friction pads 64 are formed on an integral carrier ring 68, which positions the pads 64 outward of and spaced around, the axis 70.

FIG. 6 there are shown wedge-shaped pressure pads 72 on an integral inner carrier ring 74, and in FIG. 7 the wedge-shaped pads 76 are carried on an integral outer ring 78.

While this invention has been described in conjunction with preferred embodiments thereof, it is obvious that modifications and changes therein may be made by those skilled in the art to which it pertains without departing from the spirit and scope of this invention, as defined by the claims appended hereto.

What is claimed as invention is:

1. In a fishing reel including:

a reel body;

a shaft rotatable on said reel body;

a member freely rotatable on said shaft;

stop means on said shaft on one side of said member to limit sliding movement thereof;

a pressure plate slidably but not rotatably carried on said shaft on the other side of said member;

a friction device interposed between said pressure plate and said member; and a drag adjustment nut threaded on said shaft to push said pressure plate and said friction device axially;

said friction device comprising;

at least two pads of friction material; and means defining a carrier ring rotatable and slidable on said shaft;

said pads being thicker than said carrier ring and positioned and held by said carrier ring symmetrically about said shaft and so that opposite surfaces thereof are exposed on opposite sides of said carrier ring for engagement between a pressure plate and said member.

2. The combination defined by claim 1 wherein: said pads are circular in cross-section.

3. The combination defined by claim 1 wherein: there are three pads disposed at equal angles around said carrier plate.

* * * * *